June 15, 1926.
D. E. REGAN ET AL
1,589,226
RESTRAINING DEVICE
Filed Feb. 5, 1926
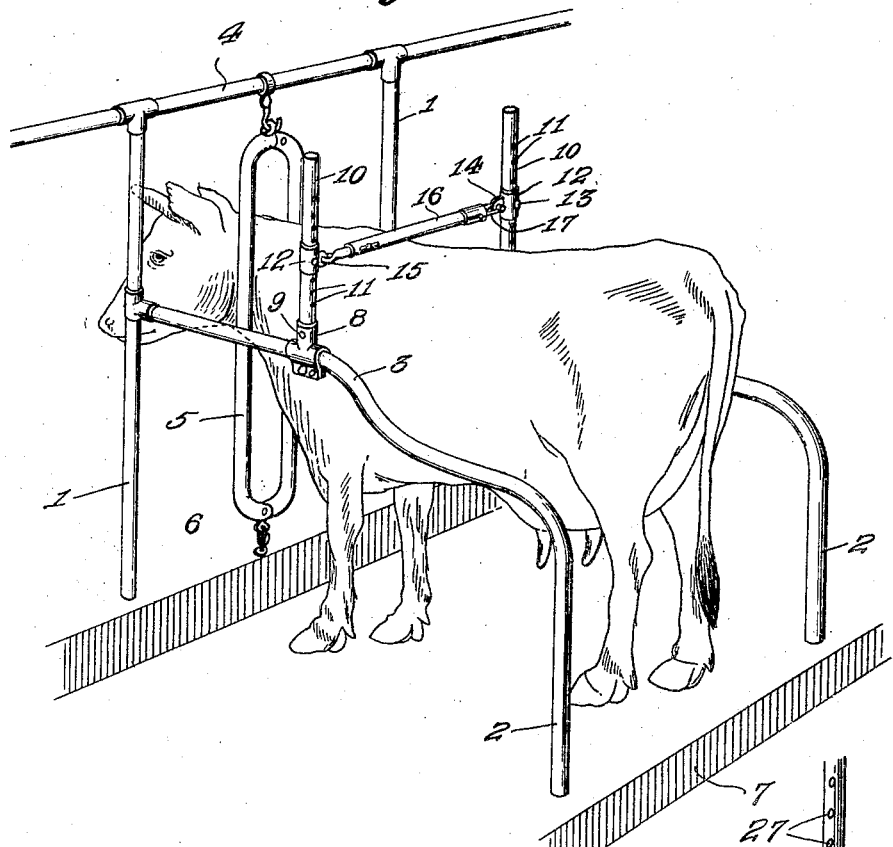
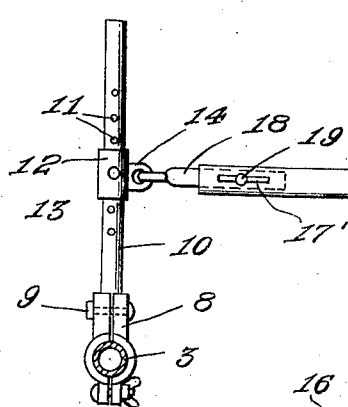
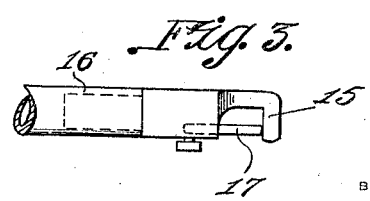
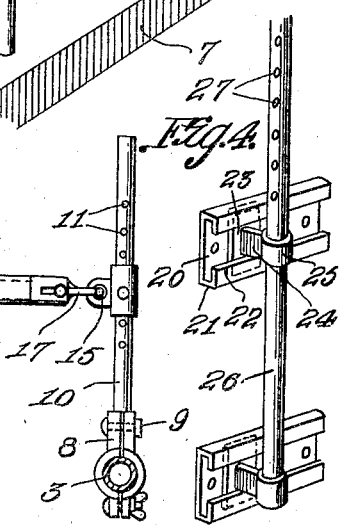

Patented June 15, 1926.

1,589,226

UNITED STATES PATENT OFFICE.

DOMINIC E. REGAN AND JAMES G. MARTIN, OF PHILADELPHIA, PENNSYLVANIA.

RESTRAINING DEVICE.

Application filed February 5, 1926. Serial No. 86,278.

It is well known that in order to urinate or defecate cows hump their backs. These evacuations mess the stalls in which the animals are tethered and render conditions unsanitary as well as soiling the hide of the cows and produce unpleasant odors. It is, therefore, the object of this invention to provide a simple appliance for stalls which will not interfere with the comfort of the animal therein, but which is positioned to contact the back of a cow should she attempt to urinate or defecate and thus cause the animal to move back in the stall so that her evacuation will be received in the gutter at the rear of the stall.

Another object is the provision of a device for this purpose which is adjustable so that a stall may be occupied by cows of varying heights.

A still further object is the provision of a device for this purpose that is of an extremely simple construction and may be readily attached to the side bars of any ordinary stall construction.

To the attainment of the foregoing and other objects which will present themselves as the description progresses, the improvement further resides in certain details of construction, combination and operative association of parts, a satisfactory embodiment of which is exemplified in the accompanying drawings.

In the drawings:

Figure 1 is a perspective view illustrating the application of the improvement.

Figure 2 is a front elevation thereof, the side bars of the stall being in section.

Figure 3 is a detail plan view of the restraining bar.

Figure 4 is a fragmentary perspective view to illustrate a slight modification.

Stalls in modern cow houses are wholly constructed of metal tubes, and such arrangement is illustrated by the drawings, but it will be obvious that my improvement may be applied to other types of stalls. The stall includes the front bars 1, the rear bars 2 which merge into the side bars 3 that are connected by couplings to the front bars 1, and the front bars have their upper ends connected by couplings to the inner top bars 4. The top bars of each stall has attached thereto the upper end of a stanchion 5, whose lower end is flexibly secured, as at 6, to the bottom of the front of the stall. A gutter 7 is arranged at the rear of all the stalls.

The above construction is common in cow houses, but I have deemed it necessary to refer to the several parts of the stalls in order that my improvement may be fully comprehended.

Secured on the side bars 3 of the stalls there are sectional sockets 8. The sections of these sockets, are, of course, removably connected, and the upper securing means 9 pass through openings and secure in the sockets upstanding members 10 which are preferably in the nature of tubes. Each member 10 is provided with a vertical series of apertures 11. Slidable on each member 10 there is a sleeve 12, a pin 13 passing through the sleeve and one of the apertures 11 in each of the members 10. The inner or confronting ends of the oppositely spaced sleeves 12 are formed with eyes 14, and these eyes are designed to receive therethrough hooks 15 on the ends of the restraining bar which is broadly indicated by the numeral 16. The mouths of the hooks are closed by preferably spring influenced hand actuated slidable latches 17. The restraining member 16 is preferably in the nature of a tube, the hook 15 on one end thereof being fixed thereto, but the second hook is preferably formed on a bar 18 that is slidably received in the tubular restraining member 16. The member 16 has an elongated slot 17 therethrough, and passing through this slot and engaging the bar 18 there is a pin 19.

The position of the device is illustrated by Figure 1 of the drawings. It will be noted by reference to this figure that the neck of the cow is received in the stanchion and that the bar 16 is so positioned that the cow cannot hump her back. The restraining bar 16, however, does not rest on the back of the cow, but should the cow hump her back in an attempt to urinate or defecate the bar 16 will offer resistance to such attempts so that it will be necessary for the cow to move backward in the stall to a position where her evacuations fall into the gutter 7.

The sectional sockets 8 are longitudinally adjustable on the bars 3, it being preferable that one of the bolts comprising the securing means 9 be engaged by a wing nut, so that the device may be thus properly positioned and sustained at desired points throughout the length of the stall to adapt itself to cows which vary in lengths.

The improvement is, of course, susceptible for use on stalls of wooden construction, or upon stalls constructed differently from that above described. Therefore, in Figure 4 of the drawings we have illustrated a fragmentary perspective view of a modified form of our improvement. In this form upper and lower guides 20 are secured on each side of the stall. These guides include flat plates that have their edges flanged in the same direction, as at 21, and from thence bent inwardly, as at 22. Thus both the upper and lower edges of each of the guides is formed with a U-shaped channel and in these channels there are received plates 23 having outstanding arms 24 that may have their outer ends rounded upon themselves, as at 25, to receive therethrough and to secure therein the upstanding tubular members 26, similar to the members 10. The upper portions of each of the tubular members 25 have spaced series of openings 27 therethrough, and these openings are designed to receive therethrough either the ends or elements on the ends of a restraining member. It is, of course, obvious that the restraining member need not be made up of telescopic sections.

The plates 23 may be moved longitudinally in the guides 20, and any desired means may be provided for sustaining the said plates in the said guides, although a slight canting or tilting of the plates will cause the edges thereof to frictionally engage with the walls 21 of what may be termed the rails 22, and thereby hold the uprights 26 when properly adjusted longitudinally on the stall.

The simplicity of our construction, the ease in which it may be installed, the cheapness at which it may be manufactured and its efficiency in practical use, will, it is thought, be perfectly apparent to those skilled in the art to which this invention relates, when the foregoing description is read in connection with the accompanying drawings. It is, of course, to be understood that we do not wish to be restricted to the precise details of the construction herein set forth, and therefore we hold ourselves entitled to all such changes therefrom as fairly fall within the scope of our invention without departing from the spirit thereof.

Having described the invention, we claim:

A stall, uprights secured to the sides and projecting beyond the upper edges of the said sides of the stall, each of said uprights having a vertical series of apertures therethrough, a socket slidable on each upright, an element passing through each socket and through one of the apertures of the uprights for adjustably sustaining the sockets thereon, eyes on the conforming faces of the sockets, a cross bar comprising adjustably associated sections, hooks on the ends of the cross bar to engage with the eyes of the sockets, and latching means for holding the hooks in such engagement.

In testimony whereof we affix our signatures.

JAMES G. MARTIN.
DOMINIC E. REGAN.

Certificate of Correction.

It is hereby certified that the name of the second patentee at the end of the drawings, in Letters Patent No. 1,589,226, granted June 15, 1926, upon the application of Dominic E. Regan and James G. Martin, of Philadelphia, Pennsylvania, for an improvement in "Restraining Devices," was erroneously printed as "J. D. Martin," whereas said name should have been printed as *James G. Martin;* and that the said Letters Patent should be read with this correction therein that the same may conform to the record of the case in the Patent Office.

Signed and sealed this 10th day of August, A. D. 1926.

[SEAL.]
M. J. MOORE,
*Acting Commissioner of Patents.*